(12) United States Patent
Park et al.

(10) Patent No.: US 10,297,387 B2
(45) Date of Patent: May 21, 2019

(54) STRESS AND MOISTURE RESISTANT CAPACITOR AND METHOD OF MANUFACTURING THE SAME

(71) Applicant: SAMSUNG ELECTRO-MECHANICS CO., LTD., Suwon-si (KR)

(72) Inventors: Heung Kil Park, Suwon-si (KR); Jong Hwan Park, Suwon-si (KR); Se Hun Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/453,167

(22) Filed: Mar. 8, 2017

(65) Prior Publication Data

US 2018/0144864 A1    May 24, 2018

(30) Foreign Application Priority Data

Nov. 21, 2016  (KR) .......................... 10-2016-0155315

(51) Int. Cl.
*H01G 4/224* (2006.01)
*H01G 4/012* (2006.01)
(Continued)

(52) U.S. Cl.
CPC ............. *H01G 4/224* (2013.01); *H01G 4/012* (2013.01); *H01G 4/232* (2013.01);
(Continued)

(58) Field of Classification Search
CPC ........ H01G 4/224; H01G 4/248; H01G 4/012; H01G 4/232; H01G 4/30
See application file for complete search history.

(56) References Cited

U.S. PATENT DOCUMENTS

| 6,903,919 B2 * | 6/2005 | Kayatani ................ H01G 2/103 29/25.41 |
| 6,903,920 B1 * | 6/2005 | Prymak .................. H01G 2/065 361/306.1 |
| 9,818,543 B2 * | 11/2017 | Tahara ..................... H01G 4/30 |

(Continued)

FOREIGN PATENT DOCUMENTS

| JP | 08162357 A | * | 6/1996 |
| JP | 2000-182888 A |   | 6/2000 |

(Continued)

*Primary Examiner* — David M Sinclair
(74) *Attorney, Agent, or Firm* — NSIP Law

(57) ABSTRACT

A capacitor includes a body including a dielectric layer, first internal electrodes and second internal electrodes. Each of the first internal electrodes and each of the second internal electrodes are alternately disposed with the dielectric layer interposed therebetween. A first connection electrode is disposed on a first end surface of the body to connect an end of the first internal electrodes. A second connection electrode is disposed on a second end surface of the body opposite to the first end surface to connect an end of the second internal electrodes. A first insulating layer is disposed on one surface of the body. A first terminal electrode and a second terminal electrode are respectively disposed on opposing end surfaces of the first insulating layer to connect the first connection electrode and the second connection electrode, respectively. A second insulating layer is disposed on another surface of the body.

15 Claims, 9 Drawing Sheets

(51) Int. Cl.
*H01G 4/232* (2006.01)
*H01G 4/30* (2006.01)
*H01G 4/248* (2006.01)
*B60R 16/023* (2006.01)
*H01G 4/12* (2006.01)

(52) U.S. Cl.
CPC ........... *H01G 4/2325* (2013.01); *H01G 4/248* (2013.01); *H01G 4/30* (2013.01); *B60R 16/0231* (2013.01); *H01G 4/12* (2013.01)

(56) References Cited

U.S. PATENT DOCUMENTS

| | | | |
|---|---|---|---|
| 2006/0088719 A1* | 4/2006 | Ito | H01G 4/1218 |
| | | | 428/469 |
| 2008/0179382 A1 | 7/2008 | Galvagni et al. | |
| 2013/0020913 A1* | 1/2013 | Shirakawa | H01G 4/30 |
| | | | 310/364 |
| 2014/0160617 A1* | 6/2014 | Kim | H01G 4/00 |
| | | | 361/301.4 |
| 2015/0124370 A1* | 5/2015 | Ahn | H01G 4/224 |
| | | | 361/272 |
| 2015/0364253 A1* | 12/2015 | Arnold | H01G 2/065 |
| | | | 174/260 |
| 2016/0276104 A1* | 9/2016 | Nishisaka | H01G 4/2325 |
| 2017/0271081 A1* | 9/2017 | Maki | H01G 4/248 |

FOREIGN PATENT DOCUMENTS

| | | | | |
|---|---|---|---|---|
| JP | 2008-205455 A | | 9/2008 | |
| JP | 2010027730 A | * | 2/2010 | |
| JP | 2012222124 A | * | 11/2012 | |
| JP | 2013026392 A | * | 2/2013 | ............... H01G 4/30 |
| JP | 2014027085 A | * | 2/2014 | ............... H01G 4/30 |
| KR | 10-2013-0040423 A | | 4/2013 | |
| KR | 10-2015-0047384 A | | 5/2015 | |
| KR | 10-2015-0118385 A | | 10/2015 | |

\* cited by examiner

II-II'

STRESS AND MOISTURE RESISTANT CAPACITOR AND METHOD OF MANUFACTURING THE SAME

CROSS-REFERENCE TO RELATED APPLICATION

This application claims the benefit under 35 USC 119(a) of priority to Korean Patent Application No. 10-2016-0155315, filed on Nov. 21, 2016 with the Korean Intellectual Property Office, the entirety of which is incorporated herein by reference for all purposes.

BACKGROUND

1. Field

The present disclosure relates to a capacitor and a method of manufacturing the same.

2. Description of Related Art

As vehicles become more electronically controlled and electrically driven, the number of electrical control units (ECUs) mounted in vehicles has increased. In addition, operation of control systems have become highly complex due to the networking required between ECUs for comprehensive management and control of the vehicle's driving system. ECUs are directly related to the safety and performance of vehicles, and thus, individual ECUs require strict reliability and durability. In the common use environment of an ECU, very high temperatures and sudden temperature changes are highly likely. In addition, ECUs are exposed to mechanical stress such as vibrations, shocks, or the like, for an extended period of time. The electronic components used in ECUs are required to have a high degree of electrical performance sufficient in the harsh environment that an ECU functions, while also meeting long-term reliability and durability requirements.

Such a requirement for reliability and durability is also required for passive components in an ECU. For the requirement of reliability and durability to be met, device dependability, not only in a typical use environment but also while under stress occurring under extreme conditions, is required.

Therefore, there is a need for highly reliable, secure and stable capacitors that may be used in such ECU environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a capacitor includes a body including a dielectric layer, first internal electrodes and second internal electrodes. Each of the first internal electrodes and each of the second internal electrodes are alternately disposed with the dielectric layer interposed therebetween. A first connection electrode is disposed on a first end surface of the body. The first connection electrode connects an end of the first internal electrodes. A second connection electrode is disposed on a second end surface of the body opposite to the first end surface. The second connection electrode connects an end of the second internal electrodes.

A first insulating layer is disposed on an upper surface of the body, an upper surface of the first connection electrode, and an upper surface of the second connection electrode. A first terminal electrode and a second terminal electrode are respectively disposed on opposing end surfaces of the first insulating layer to connect the first connection electrode and the second connection electrode, respectively. A second insulating layer is disposed on a lower surface of the body, first and second side surfaces of the body, and lower and partial side surfaces of the first and the second terminal electrodes.

The second insulating layer may be disposed to cover at least a portion of the first insulating layer.

The capacitor may further comprise a plating layer disposed on externally exposed portions of the first terminal electrode and the second terminal electrode.

The first connection electrode may include a first band portion extending from the first end surface to the upper surface, the first and second side surfaces, and the lower surface of the body, and the second connection electrode may include a second band portion extending from the second end surface to the upper surface, the first and second side surfaces, and lower surface of the body.

The first terminal electrode may be extended from an upper surface of the first insulating layer to the first and second side surfaces to connect to the first band portion. The second terminal electrode may be extended from an upper surface of the first insulating layer to the first and second side surfaces to connect to the second band portion.

Stacking the body and the first insulating layer may define a stacked body with the first terminal electrode being disposed to cover one end of the stacked body. The second terminal electrode may be disposed to cover the other end of the stacked body.

The first insulating layer may be formed of a material having greater elasticity than that of the second insulating layer.

In another general aspect, a method of manufacturing a capacitor includes forming a body including a dielectric layer, first internal electrodes and second internal electrodes. The first internal electrodes and second internal electrodes are alternately disposed with the dielectric layer interposed therebetween. A first connection electrode and a second connection electrode are formed on opposing ends of the body to connect ends of the first internal electrodes and the second terminal electrodes, respectively. A first insulating layer is formed on an upper surface of the body. A first terminal electrode and a second terminal electrode are respectively formed on opposing end surfaces of the first insulation layer to connect to the first connection electrode and the second connection electrode, respectively. A second insulating layer is formed on a lower surface of the body, first and second side surfaces of the body, and lower and partial side surfaces of the first and the second terminal electrode.

The second insulating layer may be formed by dipping the lower surface of the body, the first and second side surfaces of the body, and partial side surfaces of the first and the second terminal electrode into an insulating paste.

The second insulating layer may be formed to cover a portion of the first insulating layer.

The method of manufacturing the capacitor may further include forming a plating layer on externally exposed surface portions of the first terminal electrode and the second terminal electrode.

The first connection electrode may be formed to include a first band portion extended from the first end surface to the upper surface, the first and second side surfaces, and the lower surface of the body. The second connection electrode may be formed to include a second band portion extended from the second end surface to the upper surface, the first and second side surfaces, and lower surface of the body.

The first terminal electrode may be formed to extend from an upper and side surfaces of the first insulating layer to connect to the first band portion. The second terminal electrode may extend from an upper and side surfaces of the first insulating layer to connect to the second band portion.

When the first terminal electrode and the second terminal electrode are formed and the body and the first insulating layer are stacked to define a stacked body, the first terminal electrode may be formed to cover an end of the stacked body, and the second terminal electrode may be formed to cover another end of the stacked body.

In another general aspect, a capacitor includes a body including a dielectric layer, first internal electrodes and second internal electrodes. Each of the first internal electrodes and each of the second internal electrodes are alternately disposed with the dielectric layer interposed therebetween. A first connection electrode is disposed on a first end surface of the body. The first connection electrode connects an end of the first internal electrodes. A second connection electrode is disposed on a second end surface of the body opposite to the first end surface. The second connection electrode connects an end of the second internal electrodes. A first insulating layer is disposed on an upper surface of the body, an upper surface of the first connection electrode, and an upper surface of the second connection electrode. A first terminal electrode and a second terminal electrode are respectively disposed on opposing end surfaces of the first insulating layer to connect the first connection electrode and the second connection electrode, respectively. A second insulating layer is disposed on a lower surface of the body, first and second side surfaces of the body, and lower and partial side surfaces of the first and the second terminal electrodes. The first terminal electrode and the second terminal electrode each define a clamp extending over side surface portions of the first and second connection electrodes, respectively.

The first insulating layer may be formed of a material having greater elasticity than a material of the second insulating layer.

The ECU in a vehicle may include the capacitor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
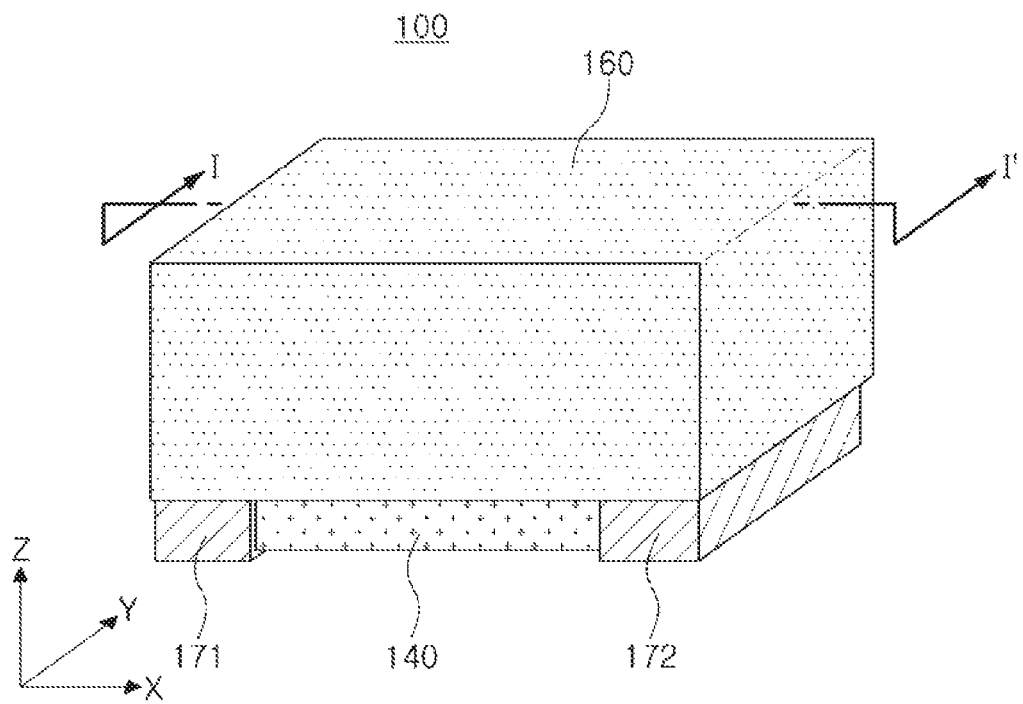
FIG. 1 is a perspective view schematically illustrating an example of a capacitor.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Capacitor

Figure 2:
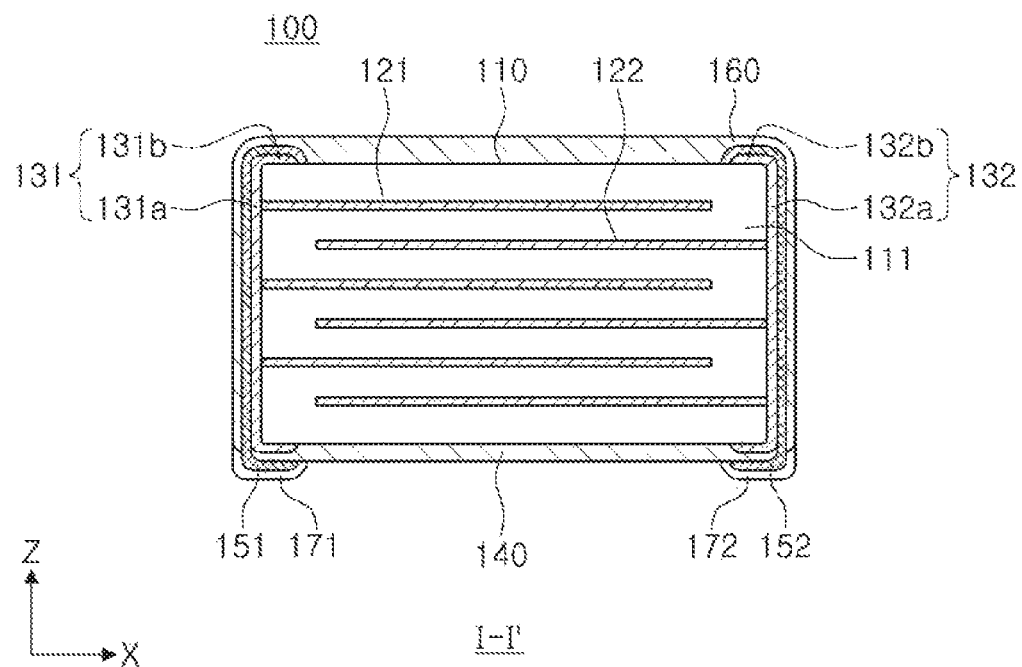
FIG. 2 is a cross-sectional view schematically illustrating the capacitor taken along line I-I' of FIG. 1.

FIG. 1 is a perspective view schematically illustrating an example of a capacitor 100, while FIG. 2 is a cross-sectional view schematically illustrating the capacitor taken along line I-I'.

The structure of the capacitor 100 will be described with reference to FIGS. 1 and 2.

The capacitor 100 includes a body 110, a first internal electrode 121 and a second internal electrode 122, a first connection electrode 131 and a second connection electrode 132, a first insulating layer 140, a first terminal electrode 151 and a second terminal electrode 152, and a second insulating layer 160.

Figure 5:
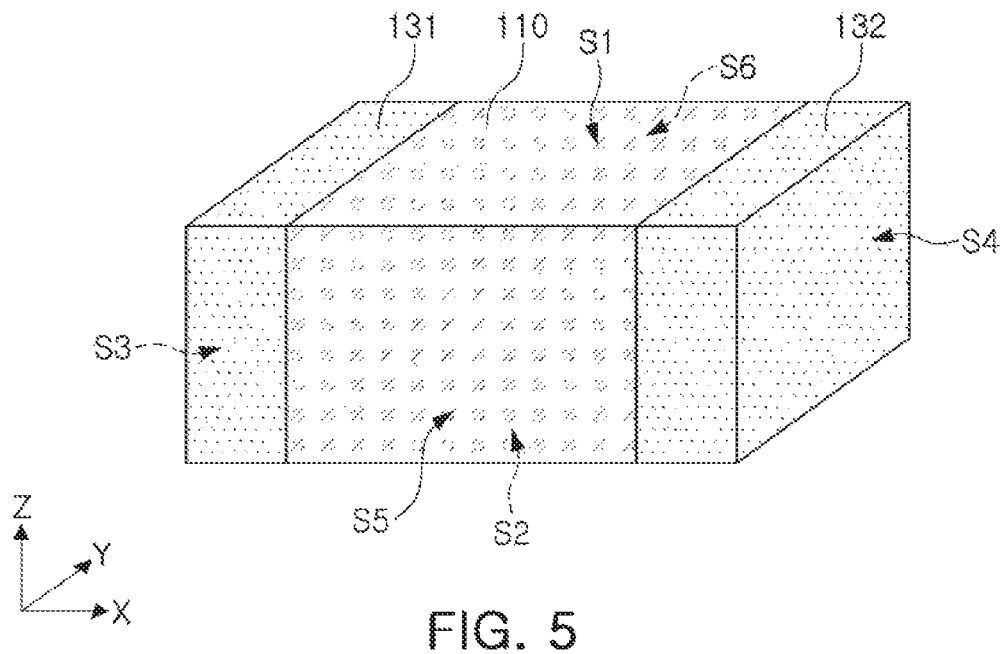
FIGS. 5 to 11 illustrate examples of operations of a method of manufacturing a capacitor.

With reference to FIG. 5, to describe surfaces of the body 110, the body 110 includes a first surface S1, a second surface S2, a third surface S3, a fourth surface S4, a fifth surface S5, and a sixth surface S6. The first surface S1 opposes the second surface S2 in a Z-direction. The third surface S3 opposes the fourth surface S4 in an X-direction, and both the third surface S3 and fourth surface S4 connect ends of the first surface S1 to the second surface S2. The fifth surface S5 opposes the sixth surface S6 in a Y-direction.

Hereinafter, the first through the sixth surfaces of the body 110 will be described with reference to FIG. 5.

The body 110 is formed, as a plurality of dielectric layers 111 that are stacked to be horizontal or perpendicular to the first surface S1 to be sintered. The shape of the body is not particularly limited, and may be a hexahedral shaped as illustrated in FIG. 5.

The plurality of dielectric layers 111 forming the body 110 are in a sintered state. Boundaries between each of the plurality of dielectric layers 111 adjacent each other may be integrated, such that the boundaries are difficult to discern without the use of a scanning electron microscope (SEM).

In addition to ceramic powder, a ceramic additive, an organic solvent, a plasticizer, a binder, a dispersant, or the like, may be further added to the dielectric layer 111, as required.

The body 110, as a part contributing to the capacity of a capacitor, may include an active layer having a plurality of internal electrodes, and a cover layer disposed around the active layer as a margin portion.

The cover layer may be formed by stacking a plurality of dielectric layers (not including an internal electrode).

The cover layer may be made of the same material and configuration as those of the dielectric layer 111 except that the cover layer does not include the internal electrode.

The cover layer may be formed by stacking a single dielectric layer or more on both sides of an internal electrode located outermost in the active layer, and may serve to prevent physical or chemical stress damage to the first internal electrode 121 and the second internal electrode 122.

The active layer may be formed by alternately stacking respective ones of a plurality of first internal electrodes 121 and a plurality of second internal electrodes 122 with a dielectric layer 111 interposed therebetween.

A surface of the first internal electrode 121 and a surface of the second internal electrode 122 are exposed to the third surface S3 and the fourth surface S4 of the body 110, respectively.

The first internal electrode 121 and the second internal electrode 122, electrodes receiving electricity having different polarities, are formed inside the body 110, and are alternately disposed with the dielectric layer 111 interposed therebetween.

With such a configuration, the dielectric layer 111 disposed between the first internal electrode 121 and the second internal electrode 122 acts as electrical insulation.

In addition, the material used to form the first internal electrode 121 and the second internal electrode 122 is not particularly limited, and may be, for example, a precious metal material such as palladium (Pd), a palladium-silver (Pd—Ag) alloy, or the like, or a conductive paste formed of one or more materials of nickel (Ni) and copper (Cu).

The conductive paste may be printed using a screen printing method, a gravure printing method, or the like.

The first connection electrode 131 is disposed on the third surface S3 of the body 110.

The first connection electrode 131 includes a first base portion 131a formed on the third surface S3 of the body 110.

In this case, the first connection electrode 131 further includes a first band portion 131b extended from the first base portion 131a to portions of the first surface S1, the second surface S2, the fifth surface S5, and the sixth surface S6 of the body 110, as required.

The second connection electrode 132 is disposed on the fourth surface S4 of the body 110.

The second connection electrode 132, as an electrode receiving electricity having a polarity different from that of the first connection electrode 131, includes a second base portion 132a formed on the fourth surface S4 of the body 110.

In this case, the second connection electrode 132 further includes a second band portion 132b extended from the second base portion 132a to portions of the first surface S1, the second surface S2, the fifth surface S5, and the sixth surface S6 of the body 110, as required.

The first connection electrode 131 is electrically connected to the first internal electrode 121 exposed to the third surface S3, and the second connection electrode 132 is electrically connected to the second internal electrode 122 exposed to the fourth surface S4.

The first connection electrode 131 and the second connection electrode 132 may be formed by sintering a composition containing metal powder and glass.

The metal powder used for formation of the first connection electrode 131 and the second connection electrode 132 may include a conductive material such as Cu, Ag, Pd, and the like, but is not limited thereto.

The first connection electrode 131 and the second connection electrode 132 serve to electrically connect the first terminal electrode 151 and the second terminal electrode 152, to be described later, to the internal electrodes 121 and 122.

The first insulating layer 140 is disposed on the first surface S1 of the body 110.

The first insulating layer 140 may be formed of a thermosetting resin, for example, an epoxy resin.

A surface opposing a surface in contact with the first surface S1 of the first insulating layer 140 may be provided as a mounting surface.

Since the first insulating layer 140 is disposed on the first surface S1 of the body 110 in a direction of the mounting surface, when the capacitor 100 is mounted on a substrate and the capacitor 100 is operated, the first insulating layer 140 may serve as a damper absorbing vibrations occurring when the capacitor is operated.

In detail, as the first insulating layer 140 is formed of a material having greater elasticity than that of the second insulating layer 160 to be described later, the first insulating layer may serve as a damper absorbing vibrations occurring when the capacitor is operated.

In other words, since the capacitor 100 in this example includes the first insulating layer 140 on the first surface S1, acoustic noise of the capacitor 100 is reduced.

In addition, the first insulating layer 140 is disposed on the first surface S1 in a direction of a mounting surface of the body 110 to protect the capacitor 100 from mechanical stress transferred from a substrate, thereby improving reliability and stability of the capacitor 100.

The first terminal electrode 151 and the second terminal electrode 152 are disposed on a mounting surface of the first insulating layer 140.

The first terminal electrode 151 and the second terminal electrode 152 are connected to the first connection electrode 131 and the second connection electrode 132, respectively.

The first terminal electrode 151 and the second terminal electrode 152 may be formed using a composition including metal powder and polymer resin. For example, since the polymer resin included in the first terminal electrode 151 and the second terminal electrode 152 is the same as the polymer resin forming the second insulating layer 160 to be described later, adhesion is improved between each of the first terminal electrode 151, the second terminal electrode 152 and the second insulating layer 160.

The metal powder used for formation of the first terminal electrode 151 and the second terminal electrode 152 may include a conductive material such as Cu, Ag, Pd, or the like, but is not limited thereto.

In addition, the first terminal electrode 151 and the second terminal electrode 152 may be formed of a material and of a method used in forming the first connection electrode 131 and the second connection electrode 132.

The structure defined by the stacking of the body 110 and the first insulating layer 140 is defined as a stacked body. In this example, in the capacitor 100, the first terminal electrode 151 and the second terminal electrode 152 are disposed on opposing ends of the stacked body in a longitudinal direction L.

For example, the first terminal electrode 151 is disposed to cover one end of the stacked body, and the second terminal electrode 152 is disposed to cover the other end of the stacked body.

In this case, the first terminal electrode 151 is disposed on the first connection electrode 131, and extends to a mounting surface of the first insulating layer 140. In addition, the second terminal electrode 152 is disposed on the second connection electrode 132, and extends to a mounting surface of the first insulating layer 140.

The second insulating layer 160 is disposed on the second surface S2 to the sixth surface S6 (on surfaces S2, S3, S4, S5, S6) of the body 110.

Since the second insulating layer is disposed to cover surfaces of the second surface S2 to the sixth surface S6 (on surfaces S2, S3, S4, S5, S6) of the body 110, the first connection electrode 131 and the second connection electrode 132 are sealed by the second insulating layer 160. Alternatively, when the first connection electrode 131 and the second connection electrode 132 include the first band portion 131b and the second band portion 132b, respectively, the first connection electrode 131 and the second connection electrode 132 are sealed by the first insulating layer 140 and the second insulating layer 160.

In this example, portions of the first terminal electrode 151 and the second terminal electrode 152, disposed on the mounting surface of the first insulating layer 140, are not covered by the second insulating layer 160.

Alternatively, portions of the first terminal electrode 151 and the second terminal electrode 152, disposed on a mounting surface, and a portion of a surface adjacent to the mounting surface, are not covered by the second insulating layer 160 to be exposed externally.

In the capacitor 100 according to an example, all remaining parts except for portions of the first terminal electrode 151 and the second terminal electrode 152 connected to an external power source are sealed by the first insulating layer 140 and the second insulating layer 160, thereby improving moisture resistance of the capacitor 100.

In addition, since the second insulating layer 160 is disposed to cover surfaces of the second surface S2 to the sixth surface S6 (on surfaces S2, S3, S4, S5, S6) of the body 110, the second surface S2 to sixth surface S6 (on surfaces S2, S3, S4, S5, S6) of the body 110 are protected from external mechanical stress.

In addition, even when moisture or a conductive foreign substance flows into an externally exposed portion of a part in which the second insulating layer 160 is in contact with each of the first terminal electrode 151 and the second terminal electrode 152, a path on which the moisture or the conductive foreign substance flows is long, thereby improving moisture resistance and reliability with respect to a conductive foreign substance.

The second insulating layer 160 may be disposed to cover at least a portion of the first insulating layer 140.

Since the second insulating layer 160 is disposed to cover at least a portion of the first insulating layer 140, a possibility in which the body 110, the first connection electrode 131, and the second connection electrode 132 will be externally exposed due to a manufacturing error, or the like is lessened. In addition, when the first insulating layer 140 and the second insulating layer 160 are formed of a material of the same type, the first insulating layer 140 and the second insulating layer 160 are prevented from being detached from the body 110 due to external stress.

The second insulating layer 160 may be formed using a thermosetting resin, and may be formed using, for example, an epoxy resin.

A first plating layer 171 and a second plating layer 172 are disposed in externally exposed regions of the first terminal electrode 151 and the second terminal electrode 152, respectively, that is, in regions in which the second insulating layer 160 is not formed.

The first plating layer 171 and the second plating layer 172 may include a nickel plating layer and a tin plating layer, but are not limited thereto.

In the capacitor 100, the first plating layer 171 and the second plating layer 172 are only formed on the mounting surface of the capacitor 100 or a portion adjacent to the mounting surface, and the first insulating layer 140 or the second insulating layer 160 is disposed in other parts.

Thus, when the capacitor 100 is mounted, since solder is attached to the mounting surface of the capacitor 100 or only a part adjacent to the mounting surface, the area required for mounting is reduced, thereby increasing mounting efficiency of the capacitor 100.

Figure 3:
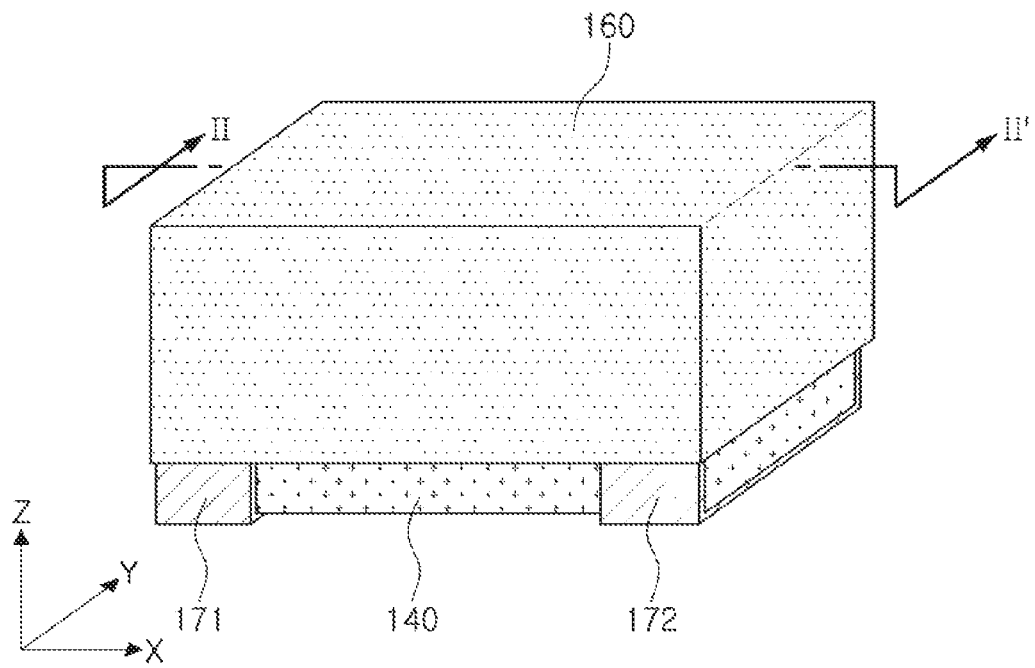
FIG. 3 is a perspective view schematically illustrating another example of a capacitor.
Figure 4:
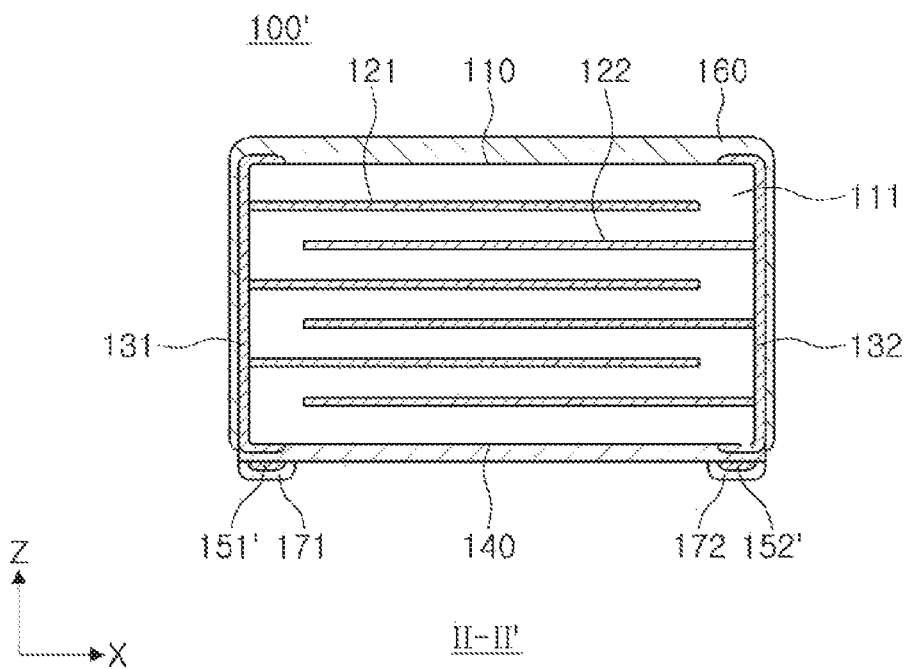
FIG. 4 is a cross-sectional view schematically illustrating the capacitor taken along line II-II' of FIG. 3.

FIG. 3 is a perspective view schematically illustrating an example of capacitor 100', and FIG. 4 is a cross-sectional view schematically illustrating the capacitor 100' of FIG. 3, taken along line II-II'.

In describing the structure of the capacitor 100', descriptions with respect to configurations that are the same as that of the capacitor 100 in FIGS. 1 and 2, described previously, will be omitted.

With reference to FIGS. 3 and 4, in the capacitor 100', a first terminal electrode 151' is extended from a surface of the first insulating layer 140, that is, a mounting surface, to the fifth surface S5 and the sixth surface S6 to be connected to the first band portion 131b. The second terminal electrode 152' is extended form a surface of the first insulating layer 140 to the fifth surface S5 and the sixth surface S6 to be connected to the second band portion 132b.

Since the second insulating layer 160 is disposed on the second surface S2 to the sixth surface S6 (on surfaces S2, S3, S4, S5, S6) of the body 110, portions of parts, in which the first terminal electrode 151' and the second terminal electrode 152' are extended to the fifth surface S5 and the sixth surface S6, respectively, may be covered by the second insulating layer 160.

In this case, the first plating layer 171 and the second plating layer 172 are disposed on portions of the first terminal electrode 151' and the second terminal electrode 152', respectively, and are not covered by the second insulating layer 160.

In a manner different from the capacitor 100, in the capacitor 100', since the first terminal electrode 151' and the second terminal electrode 152' are not formed on both ends of the capacitor 100' in a longitudinal direction, the plating layers 171 and 172 are not formed on both ends of the capacitor 100' in the longitudinal direction.

Thus, when the capacitor 100' is mounted, since solder is not attached to both ends of the capacitor 100' in a longitudinal direction, an area required for mounting is further reduced when compared to the capacitor 100, thereby further increasing mounting efficiency of the capacitor 100'.

FIGS. 5 to 11 illustrate examples of operations of a method of manufacturing a capacitor.

Hereinafter, with reference to FIGS. 5 to 11, a method of manufacturing the capacitor according to the different examples will be described.

To describe a method of manufacturing the capacitor according to the examples, reference is made to FIGS. 1 to 4.

First, with reference to FIG. 5, the body 110 is prepared and the first connection electrode 131 and the second connection electrode 132 are formed.

To prepare the body 110, a plurality of ceramic sheets are prepared. In addition to ceramic powder, a ceramic additive, an organic solvent, a plasticizer, a binder, a dispersant, and the like may be further added to a ceramic sheet, as required.

A conductive paste is used on an upper part of the ceramic sheet to print a first internal electrode and a second internal electrode. The conductive paste used for the formation of the internal electrodes is not particularly limited, and may include, for example, precious metal materials such as Pd, a Pd—Ag alloy, or the like, and one or more materials like Ni and Cu. The method of forming the internal electrode may use a screen printing method, a gravure printing method, or the like.

The ceramic sheet on which the internal electrode is printed is stacked, pressed, and sintered. The body 110 is formed by cutting the sintered ceramic sheet.

When the ceramic sheet is stacked, portions of the ceramic sheets on which the internal electrode is not printed are stacked on an upper part and a lower part of an active layer to form an upper cover layer and a lower cover layer, respectively. In this example, a portion in which the internal electrode is printed on is defined as the active layer, and the active layer denotes a part contributing to formation of the capacitance of a capacitor.

The body 110 may have a hexahedral shape, but is not limited thereto. As illustrated in FIG. 5, when the body 110 has a hexahedral shape, the body 110 has a first surface S1 and a second surface S2 opposing each other in a Z-direction. A third surface S3 and a fourth surface S4 connecting to the first surface S1 and the second surface S2. The first surface S1 opposes the second surface S2 in an X-direction. A fifth surface S5 and a sixth surface S6 opposing each other in a Y-direction. Then fifth surface S5 and a sixth surface S6 both connect to the first surface S1 and the second surface S2.

In this example, a first internal electrode and a second internal electrode are exposed to the third surface S3 and the fourth surface S4 of the body 110, respectively.

After the body 110 is formed, the first connection electrode 131 and the second connection electrode 132 are formed on the third surface S3 and the fourth surface S4 of the body 110, respectively.

The first connection electrode 131 and the second connection electrode 132 may be formed by sintering a composition containing metal powder and glass.

The metal powder used for formation of the first connection electrode 131 and the second connection electrode 132 may include a conductive material such as Cu, Ag, Pd, or the like.

As illustrated in FIG. 2, the first connection electrode 131 includes a first base portion 131a formed on the third surface S3 of the body 110.

The first connection electrode 131 further includes a first band portion 131b extended from the first base portion 131a to portions of the first surface S1, the second surface S2, the fifth surface S5, and the sixth surface S6 of the body 110, as required.

As illustrated in FIG. 2, the second connection electrode 132, as an electrode receiving electricity having a polarity different from that of the first connection electrode 131, may include the second base portion 132a formed on the fourth surface S4 of the body 110.

The second connection electrode 132 further includes the second band portion 132b extended from the second base portion 132a to portions of the first surface S1, the second surface S2, the fifth surface S5, and the sixth surface S6 of the body 110, as required.

The first connection electrode 131 is electrically connected to the first internal electrode 121 exposed to the third surface S3, and the second connection electrode 132 is electrically connected to the second internal electrode 122 exposed to the fourth surface S4.

After the body 110, as well as the first connection electrode 131 and the second connection electrode 132 are formed, forming a first insulating layer 140 on one surface of the body 110, for example, the first surface S1 is performed.

Figure 6:
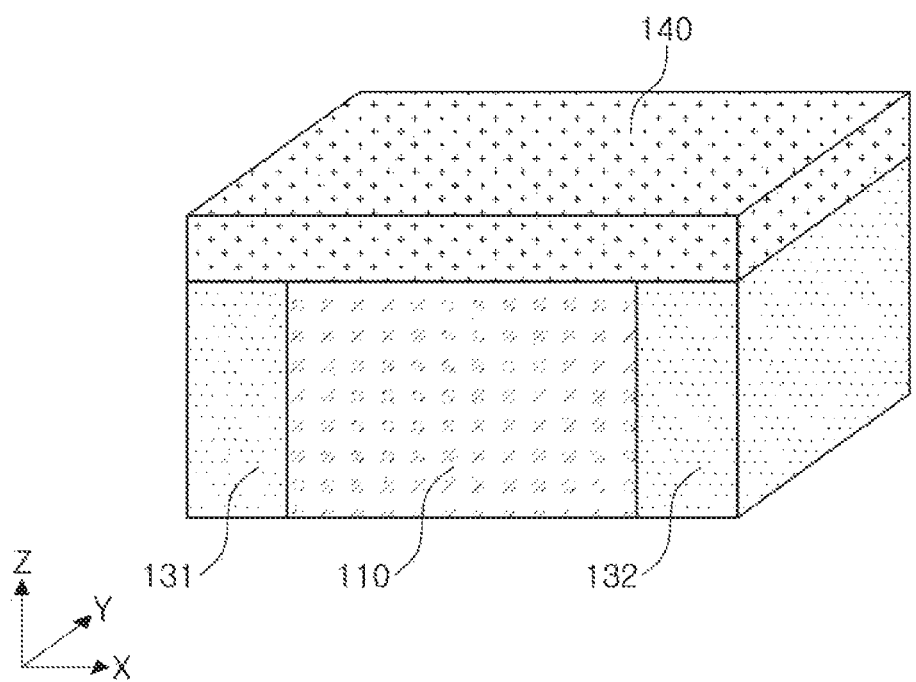

With reference to FIG. 6, when the first connection electrode 131 and the second connection electrode 132 include the first band portion 131b and the second band portion 132b, respectively, the first insulating layer 140 is not only be disposed on the first surface S1 of the body 110, but is also disposed to cover the first band portion 131b and the second band portion 132b disposed on the first surface S1.

The first insulating layer 140 may be formed using a thermosetting resin, may be, for example, an epoxy resin.

In this case, a surface opposing a surface in contact with the first surface S1 of the first insulating layer 140 is provided as a mounting surface.

Figure 7:
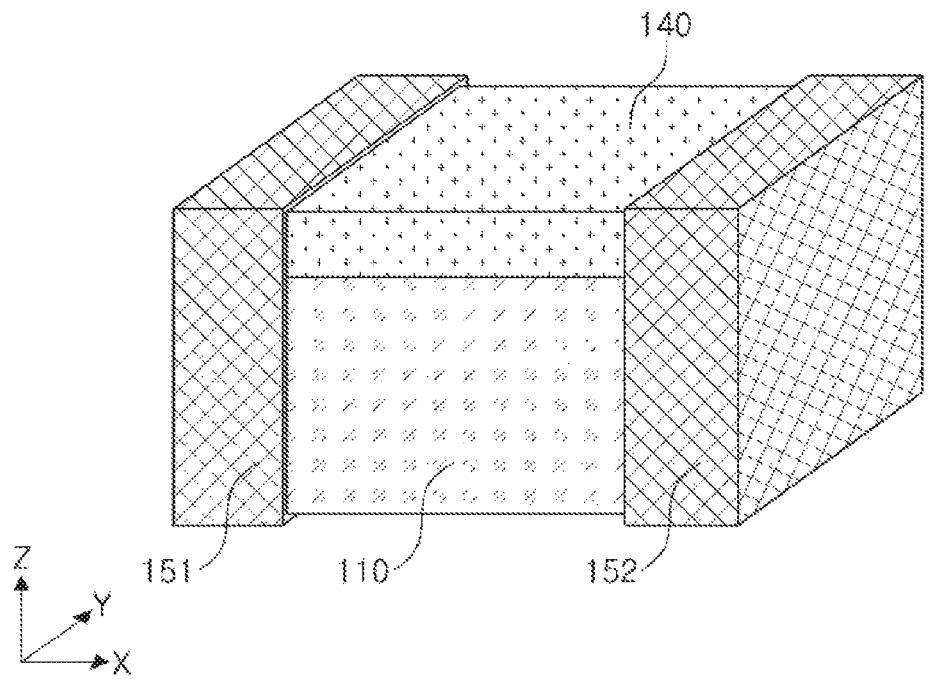
Figure 8:
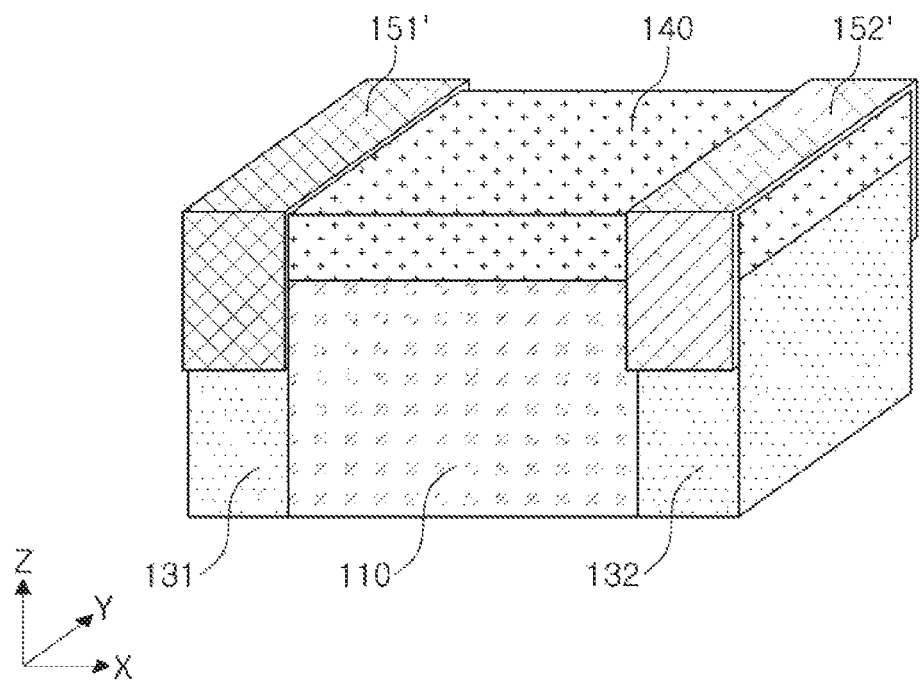

Next, as illustrated in FIGS. 7 and 8, a terminal electrode is formed.

A first terminal electrode 151 and a second terminal electrode 152 are disposed on a surface of the first insulating layer 140, that is, a mounting surface.

The first terminal electrode 151 and the second terminal electrode 152 are connected to the first connection electrode 131 and the second connection electrode 132, respectively.

The first terminal electrode 151 and the second terminal electrode 152 may be formed using a composition including metal powder and polymer resin. For example, since the polymer resin included in the first terminal electrode 151 and the second terminal electrode 152 is the same as the polymer resin forming the second insulating layer 160 to be described later, adhesion of the second insulating layer 160 to the first terminal electrode 151 and the second terminal electrode 152 and the second insulating layer 160 is significantly improved.

Metal powder used for formation of the first terminal electrode 151 and the second terminal electrode 152 may include a conductive material such as Cu, Ag, Pd, or the like, but is not limited thereto.

In addition, the first terminal electrode 151 and the second terminal electrode 152 may be formed of a material and using a method the same as those of the first connection electrode 131 and the second connection electrode 132, but are not limited thereto.

A structure in which the body 110 and the first insulating layer 140 are stacked is defined as a stacked body. In this case, with reference to FIG. 7, in the capacitor 100, the first terminal electrode 151 and the second terminal electrode 152 are disposed on both ends of the stacked body in a longitudinal direction L.

For example, the first terminal electrode 151 is disposed to cover one end of the stacked body, and the second terminal electrode 152 is disposed to cover the other end of the stacked body.

In this case, the first terminal electrode 151 is disposed on the first connection electrode 131 disposed on the third surface S3, and is formed to be extended to a mounting surface of the first insulating layer 140. In addition, the second terminal electrode 152 is disposed on the second connection electrode 132 disposed on the fourth surface S4, and is formed to be extended to a mounting surface of the first insulating layer 140.

In a manner different from FIG. 7, with reference to FIG. 8, the first terminal electrode 151' is extended from a surface of the first insulating layer 140, that is, a mounting surface to the fifth surface S5 and the sixth surface S6 to be connected to the first band portion 131b, and the second terminal electrode 152' is extended from a surface of the first insulating layer 140 to the fifth surface S5 and the sixth surface S6 to be connected to the second band portion 132b.

Figure 9:
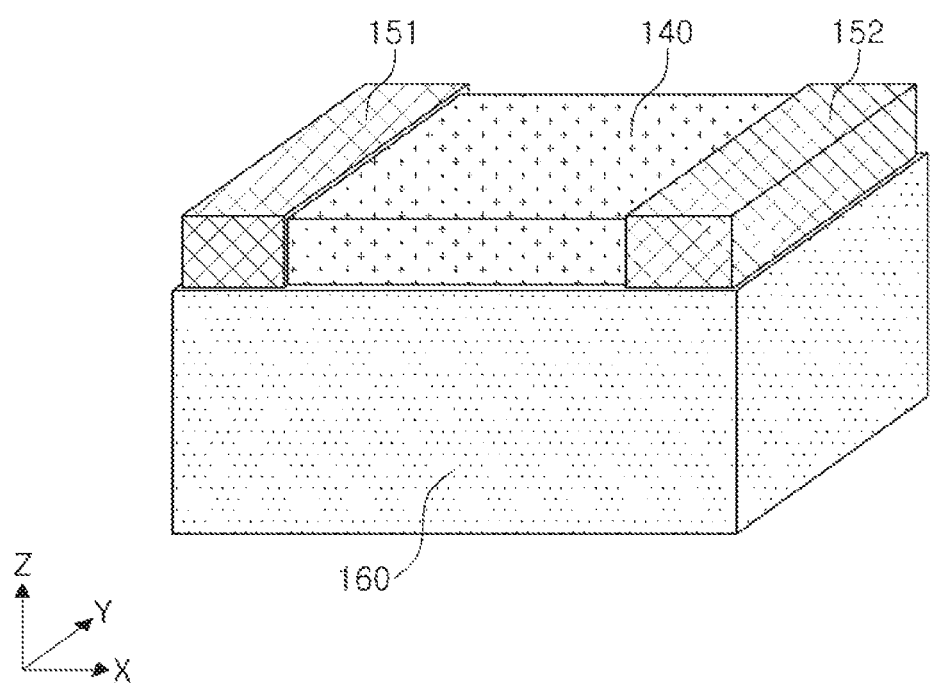

After the first terminal electrode 151 and the second terminal electrode 152 are formed, the second insulating layer 160 is formed as illustrated in FIG. 9.

The second insulating layer 160 is formed on the second surface S2 to the sixth surface S6 (on surfaces S2, S3, S4, S5, S6) of the body 110.

Figure 10A:
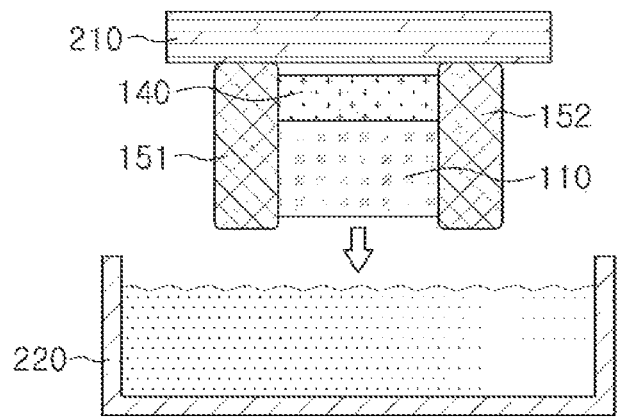
Figure 10B:
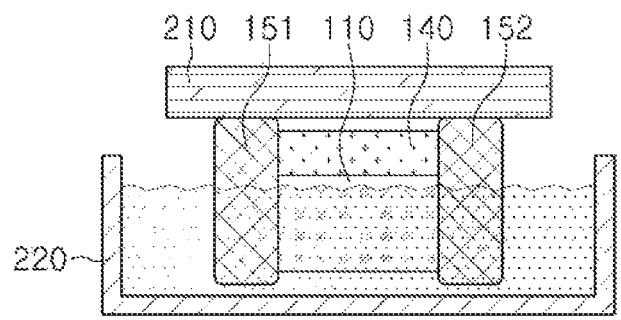
Figure 10C:
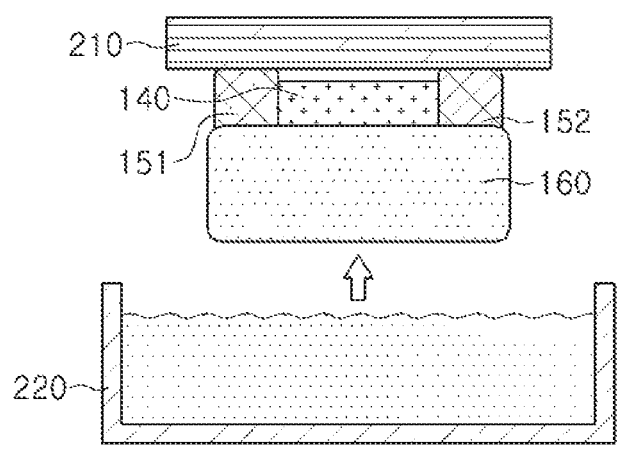

FIGS. 10A to 10C illustrate each of the operations in a method of forming a second insulating layer 160.

Here, a structure in which the body 110 and the first insulating layer 140 are stacked is defined as a stacked body.

First, with reference to FIG. 10A, the stacked body in which a first terminal electrode 151 and a second terminal electrode 152 are formed is attached to a carrier substrate 210, and a water tank 220 containing an insulating paste is prepared.

When the stacked body in which the first terminal electrode 151 and the second terminal electrode 152 are formed and attached to the carrier substrate 210, a surface on which the first insulating layer 140 is formed is required to be attached to the carrier substrate 210.

In other words, the stacked body is attached to the carrier substrate 210 to allow the second surface S2 to the sixth surface S6 (on surfaces S2, S3, S4, S5, S6) of the body 110 to be disposed above the water tank 220.

The insulating paste may include a thermosetting resin, and may include, for example, an epoxy resin.

By lowering the carrier substrate 210, as illustrated in FIG. 10B, the stacked body is immersed in the insulating paste contained in the water tank 220. In other words, a second insulating layer is formed when the second surface S2 to the sixth surface S6 (on surfaces S2, S3, S4, S5, S6) of the body 110 are dipped into the insulating paste.

The carrier substrate 210 is lowered and the stacked body is immersed in the insulating paste until the second surface S2 to the sixth surface S6 (on surfaces S2, S3, S4, S5, S6) of the body 110 are fully covered.

Alternatively, the carrier substrate 210 is lowered until a portion of the first insulating layer 140 is immersed in the insulating paste.

Finally, after the stacked body is removed from the water tank 220 and hardened. Thus, as illustrated in FIG. 10C, the second insulating layer 160 is formed on the second surface S2 to the sixth surface S6 (on surfaces S2, S3, S4, S5, S6) of the body 110.

Figure 11:
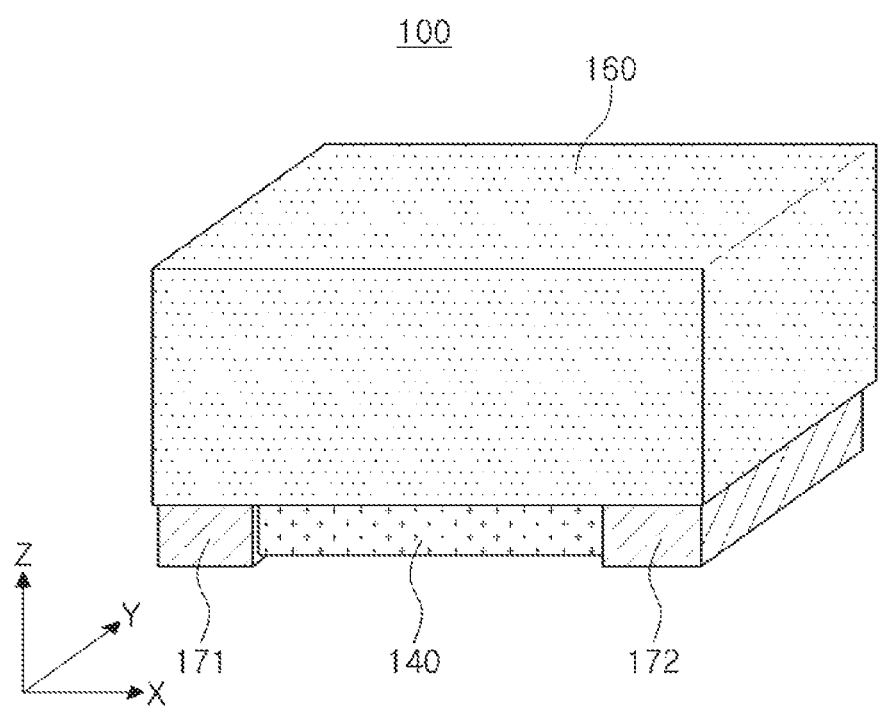

FIG. 11 illustrates a body in which the second insulating layer 160 is formed being turned upside down. The first plating layer 171 and the second plating layer 172 are formed respectively on the first terminal electrode 151 and the second terminal electrode 152 which are exposed.

With regard to the first plating layer 171 and the second plating layer 172, after a nickel plating layer is formed, a tin plating layer may be formed on the nickel plating layer, but an exemplary embodiment is not limited thereto.

Figure 12:
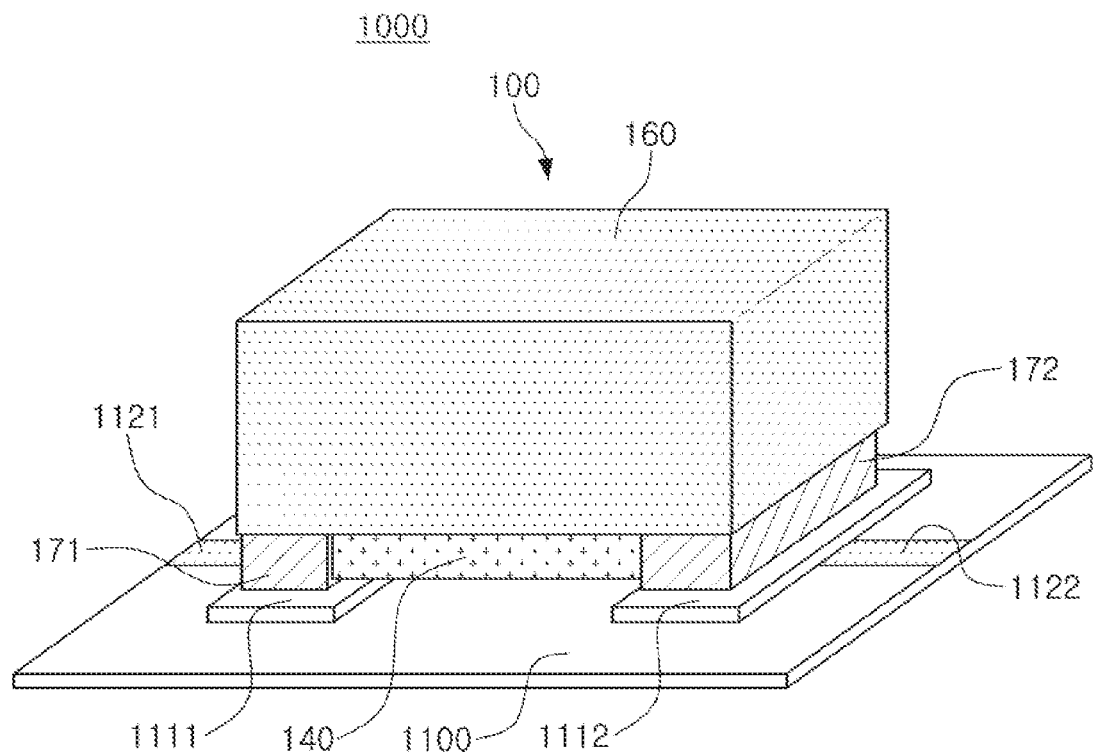
FIG. 12 is a perspective view schematically illustrating an example of a mounting substrate on which a capacitor is disposed.

FIG. 12 is a perspective view schematically illustrating an example of mounting substrate 1000 on which the capacitor 100 is disposed.

With reference to FIG. 12, the mounting substrate 1000 on which the capacitor 100 is disposed includes a substrate 1100, a first pad electrode 1111 and a second pad electrode 1112 disposed on the substrate 1100, and circuit patterns 1121 and 1122 connecting each of the first pad electrode 1111 and the second pad electrode 1112 and an external power source.

The first pad electrode 1111 and the second pad electrode 1112 may be bonded by solder and electrically connected to the first plating layer 171 and the second plating layer 172, respectively.

Since the first plating layer 171 and the second plating layer 172 are only formed to a height of a mounting surface and a height adjacent to the mounting surface, the amount of solder attached to a side surface of the capacitor 100 is less in comparison with a case in which an external electrode is formed on both ends of a capacitor.

Since an amount of solder attached to a side surface of the capacitor 100 is less, the area required when the capacitor 100 is mounted is reduced.

In addition, the first insulating layer 140 is disposed in a part of the capacitor 100, adjacent to the substrate 1100.

Since the first insulating layer 140 is disposed in a part of the capacitor 100, adjacent to the substrate 1100, when the capacitor 100 is mounted on a substrate and the capacitor 100 is operated, the first insulating layer 140 may serve as a damper absorbing vibrations occurring when a capacitor is operated.

In detail, as the first insulating layer 140 is formed of a material having greater elasticity than that of the second insulating layer 160, the first insulating layer may better serve as a damper absorbing vibrations occurring when a capacitor is operated.

In other words, since the capacitor 100 in the examples includes the first insulating layer 140 on a portion of the capacitor 100 adjacent to the substrate 1100, acoustic noise of the capacitor 100 is reduced.

Figure 13:
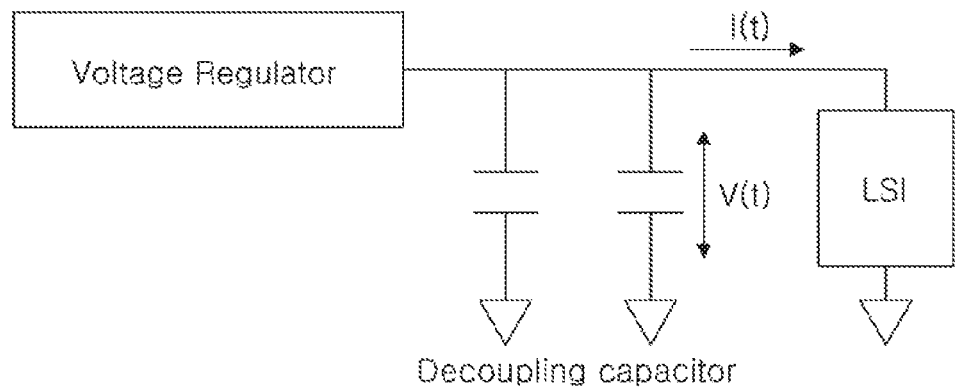
FIG. 13 is a circuit diagram schematically illustrating an example of a capacitor being used as a decoupling capacitor of a large scale integration (LSI) power circuit.
Figure 14:
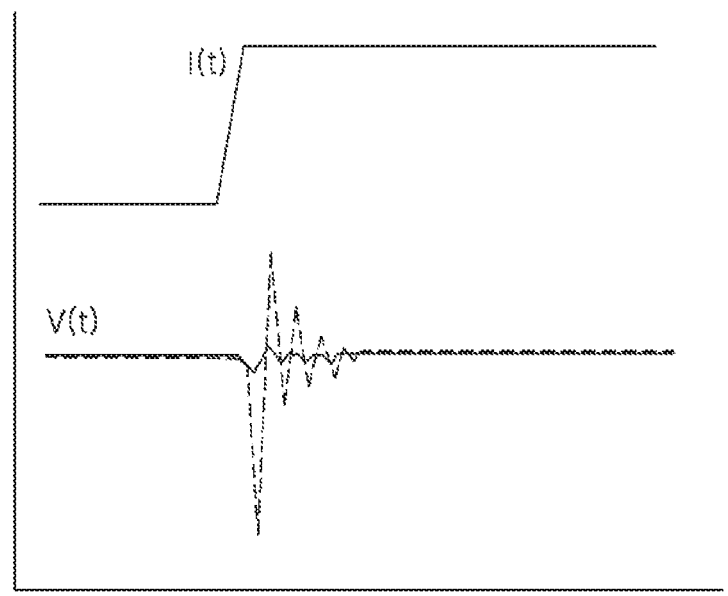
FIG. 14 is a graph illustrating an example of a current change and a voltage variation of the capacitor of FIG. 13.

FIG. 13 is a circuit diagram schematically illustrating an example in which a capacitor is used as a decoupling capacitor of a large scale integration (LSI) power circuit, and FIG. 14 is a graph illustrating a current change and voltage variations of the capacitor of FIG. 13.

With reference to FIGS. 13 and 14, a decoupling capacitor absorbs an abrupt change in current flowing in an LSI power circuit and variations of voltage occurring due to wiring inductance, thereby serving to stabilize the power supply voltage.

When a stacked capacitor according to the examples is provided as a decoupling capacitor used in an LSI power circuit, as illustrated in FIG. 14, since capacitance is large as a single object while an electronic shelf label (ESL) is small, absorption of the current change and voltage variations occurring by wiring inductance is performed well.

As set forth above, a capacitor including a first insulating layer and a second insulating layer for protecting a body is protected from mechanical stress and moisture resistant, which improves reliability and stability.

In addition, in the capacitor according to the examples, as a first insulating layer is disposed on a surface provided as a mounting surface of the body, acoustic noise is reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A capacitor, comprising:
a body comprising a dielectric layer, first internal electrodes and second internal electrodes, each of the first internal electrodes and each of the second internal electrodes alternately disposed with the dielectric layer interposed therebetween;
a first connection electrode disposed on a first end surface of the body, the first connection electrode connecting an end of the first internal electrodes;
a second connection electrode disposed on a second end surface of the body opposite to the first end surface, the second connection electrode connecting an end of the second internal electrodes;
a first insulating layer disposed on one surface of the body, one surface of the first connection electrode, and one surface of the second connection electrode;
a first terminal electrode and a second terminal electrode respectively disposed on the first insulating layer at opposing ends to connect the first connection electrode and the second connection electrode, respectively; and
a second insulating layer disposed on another surface of the body, first and second side surfaces of the body, and another and partial side surfaces of the first and the second terminal electrodes,
wherein the first insulating layer extends to the first and second side surfaces of the body, and the second insulating layer is disposed to cover at least a portion of the first insulating layer extended to the first and second side surfaces of the body such that at least a portion of the surface of the body is covered by the first insulating layer, the second insulating layer, and the first or the second terminal electrode disposed between the first insulating layer and the second insulating layer, and
wherein at least a portion of one or more of the first and second terminal electrodes is exposed outside of the second insulating layer on one or more of the first side surface, second side surface, first end surface, and second end surface of the body.

2. The capacitor of claim 1, further comprising a plating layer disposed on externally exposed portions of the first terminal electrode and the second terminal electrode.

3. The capacitor of claim 1, wherein the first connection electrode comprises a first band portion extending from the first end surface to the one surface, the first and second side surfaces, and the another surface of the body, and
the second connection electrode comprises a second band portion extending from the second end surface to the one surface, the first and second side surfaces, and another surface of the body.

4. The capacitor of claim 3, wherein the first terminal electrode is extended from one surface of the first insulating layer to the first and second side surfaces to connect to the first band portion, and
the second terminal electrode is extended from one surface of the first insulating layer to the first and second side surfaces to connect to the second band portion.

5. The capacitor of claim 1, wherein stacking the body and the first insulating layer defines a stacked body with the first terminal electrode being disposed to cover one end of the stacked body, and the second terminal electrode being disposed to cover the other end of the stacked body.

6. The capacitor of claim 1, wherein the first insulating layer is formed of a material having greater elasticity than that of the second insulating layer.

7. A method of manufacturing a capacitor comprising:

forming a body comprising a dielectric layer, first internal electrodes and second internal electrodes, the first internal electrodes and second internal electrodes alternately disposed with the dielectric layer interposed therebetween;

forming a first connection electrode and a second connection electrode on opposing ends of the body to connect ends of the first internal electrodes and the second terminal electrodes, respectively;

forming a first insulating layer on one surface of the body;

forming a first terminal electrode and a second terminal electrode respectively on the first insulation layer at opposing ends to connect to the first connection electrode and the second connection electrode, respectively; and forming a second insulating layer on another surface of the body, first and second side surfaces of the body, and another and partial side surfaces of the first and the second terminal electrodes, wherein the first insulating layer extends to the first and second side surfaces of the body, and the second insulating layer is disposed to cover at least a portion of the first insulating layer extended to the first and second side surfaces of the body such that at least a portion of the surface of the body is covered by the first insulating layer, the second insulating layer, and the first or the second terminal electrode disposed between the first insulating layer and the second insulating layer, and wherein at least a portion of the first or the second terminal electrode is not covered by the second insulating layer and exposed onto the first or the second side surface of the body.

8. The method of manufacturing the capacitor of claim 7, wherein the second insulating layer is formed by dipping the another surface of the body, the first and second side surfaces of the body, and partial side surfaces of the first and the second terminal electrode into an insulating paste.

9. The method of manufacturing the capacitor of claim 7, further comprising forming a plating layer on externally exposed surface portions of the first terminal electrode and the second terminal electrode.

10. The method of manufacturing the capacitor of claim 7, wherein the first connection electrode is formed to include a first band portion extended from the first end surface to the one surface, the first and second side surfaces, and the another surface of the body, and the second connection electrode is formed to include a second band portion extended from the second end surface to the one surface, the first and second side surfaces, and another surface of the body.

11. The method of manufacturing the capacitor of claim 10, wherein the first terminal electrode is formed to extend from one and side surfaces of the first insulating layer to connect to the first band portion, and the second terminal electrode to extend from one surface and side surfaces of the first insulating layer to connect to the second band portion.

12. The method of manufacturing the capacitor of claim 7, wherein when the first terminal electrode and the second terminal electrode are formed and the body and the first insulating layer are stacked to define a stacked body, the first terminal electrode is formed to cover an end of the stacked body, and the second terminal electrode is formed to cover another end of the stacked body.

13. A capacitor, comprising:

a body comprising a dielectric layer, first internal electrodes and second internal electrodes, each of the first internal electrodes and each of the second internal electrodes alternately disposed with the dielectric layer interposed therebetween;

a first connection electrode disposed on a first end surface of the body, the first connection electrode connecting an end of the first internal electrodes;

a second connection electrode disposed on a second end surface of the body opposite to the first end surface, the second connection electrode connecting an end of the second internal electrodes;

a first insulating layer disposed on one surface of the body, one surface of the first connection electrode, and one surface of the second connection electrode; and a second insulating layer disposed on another surface of the body, first and second side surfaces of the body, and another and partial side surfaces of the first and the second terminal electrodes; and a first terminal electrode and a second terminal electrode respectively disposed on the first insulating layer at opposing ends to connect the first connection electrode and the second connection electrode, respectively;

wherein the first terminal electrode and the second terminal electrode each define a clamp extending over side surface portions of the first and second connection electrodes, respectively, wherein the first insulating layer extends to the first and second side surfaces of the body, and the second insulating layer is disposed to cover at least a portion of the first insulating layer extended to the first and second side surfaces of the body such that at least a portion of the surface of the body is covered by the first insulating layer, the second insulating layer, and the first or the second terminal electrode disposed between the first insulating layer and the second insulating layer, and wherein at least a portion of the first or the second terminal electrode is not covered by the second insulating layer and exposed onto the first or the second side surface of the body.

14. The capacitor of claim 13, wherein the first insulating layer is formed of a material having greater elasticity than a material of the second insulating layer.

15. A vehicle comprising an electronic control unit comprising the capacitor of claim 13.

* * * * *